(12) United States Patent
Nunnink et al.

(10) Patent No.: US 9,979,933 B1
(45) Date of Patent: May 22, 2018

(54) MODULAR VISION SYSTEM

(71) Applicant: Cognex Corporation, Natick, MA (US)

(72) Inventors: Laurens Nunnink, Simpleveld (NL); Rene Delasauce, Aachen (DE)

(73) Assignee: Cognex Corporation, Natick, MA (US)

( * ) Notice: Subject to any disclaimer, the term of this patent is extended or adjusted under 35 U.S.C. 154(b) by 0 days. days.

(21) Appl. No.: 14/081,884

(22) Filed: Nov. 15, 2013

(51) Int. Cl.
| | | |
|---|---|---|
| *H04N 5/225* | (2006.01) | |
| *H04N 7/18* | (2006.01) | |
| *G06K 7/10* | (2006.01) | |
| *G03B 17/02* | (2006.01) | |
| *G03B 17/04* | (2006.01) | |
| *H04M 1/02* | (2006.01) | |

(52) U.S. Cl.
CPC ............. *H04N 7/18* (2013.01); *G03B 17/02* (2013.01); *G03B 17/04* (2013.01); *G06K 7/10821* (2013.01); *G06K 7/10831* (2013.01); *G06K 7/10881* (2013.01); *H04M 1/0264* (2013.01); *H04N 5/2254* (2013.01); *H04N 5/2257* (2013.01); *H04N 5/2256* (2013.01)

(58) Field of Classification Search
None
See application file for complete search history.

(56) References Cited

U.S. PATENT DOCUMENTS

| | | | | |
|---|---|---|---|---|
| 5,477,044 A | * | 12/1995 | Aragon | 235/472.01 |
| 5,576,530 A | * | 11/1996 | Hagerty | 235/462.47 |
| 5,600,116 A | * | 2/1997 | Seo et al. | 235/455 |
| 5,796,088 A | * | 8/1998 | Wall | 235/472.01 |
| 5,808,289 A | * | 9/1998 | Becker | 235/472.01 |
| 6,866,197 B1 | | 3/2005 | Detwiler et al. | |
| 7,204,420 B2 | | 4/2007 | Barkan et al. | |
| 7,219,843 B2 | | 5/2007 | Havens et al. | |
| 7,370,802 B2 | | 5/2008 | Wood et al. | |
| 7,746,511 B2 | | 6/2010 | Hamilton et al. | |
| 8,413,902 B2 | | 4/2013 | Oliva et al. | |

(Continued)

OTHER PUBLICATIONS

Cognex, "http://www.cognex.com/products/barcode-readers-scanners/dataman-150-260-barcode-decoder", "DataMan 150-260 Datasheet", May 2015.*

*Primary Examiner* — Roberto Velez
*Assistant Examiner* — Quan Pham
(74) *Attorney, Agent, or Firm* — Loginov & Associates

(57) ABSTRACT

This invention provides a modular vision system. In an embodiment, the modular vision system comprises at least three primary modules/components. A main module contains a vision sensor and processor. An optical module contains a lens, focusing and illumination assemblies. An interface module contains external connectors. This combination enables either a linear or angled arrangement. The main module includes with a mating surface on the side opposite the sensor that is angled with respect to the sensor plane. The interface module defines a mating surface with respect the surface containing the connectors for the cables. A connector removably interconnects the interface module and the main module. The connector assembly, and each individual contact, is constructed and arranged to enable interconnection of the main and interface modules in both the straight and right angle arrangements by rotating the modules about a 180-degree orientation. In each orientation, the connector delivers appropriate electrical contact.

20 Claims, 11 Drawing Sheets

(56) References Cited

U.S. PATENT DOCUMENTS

2010/0176319 A1\* 7/2010 Nunnink et al. ............. 250/566
2011/0233278 A1 9/2011 Patel et al.
2012/0018516 A1 1/2012 Gao et al.

\* cited by examiner

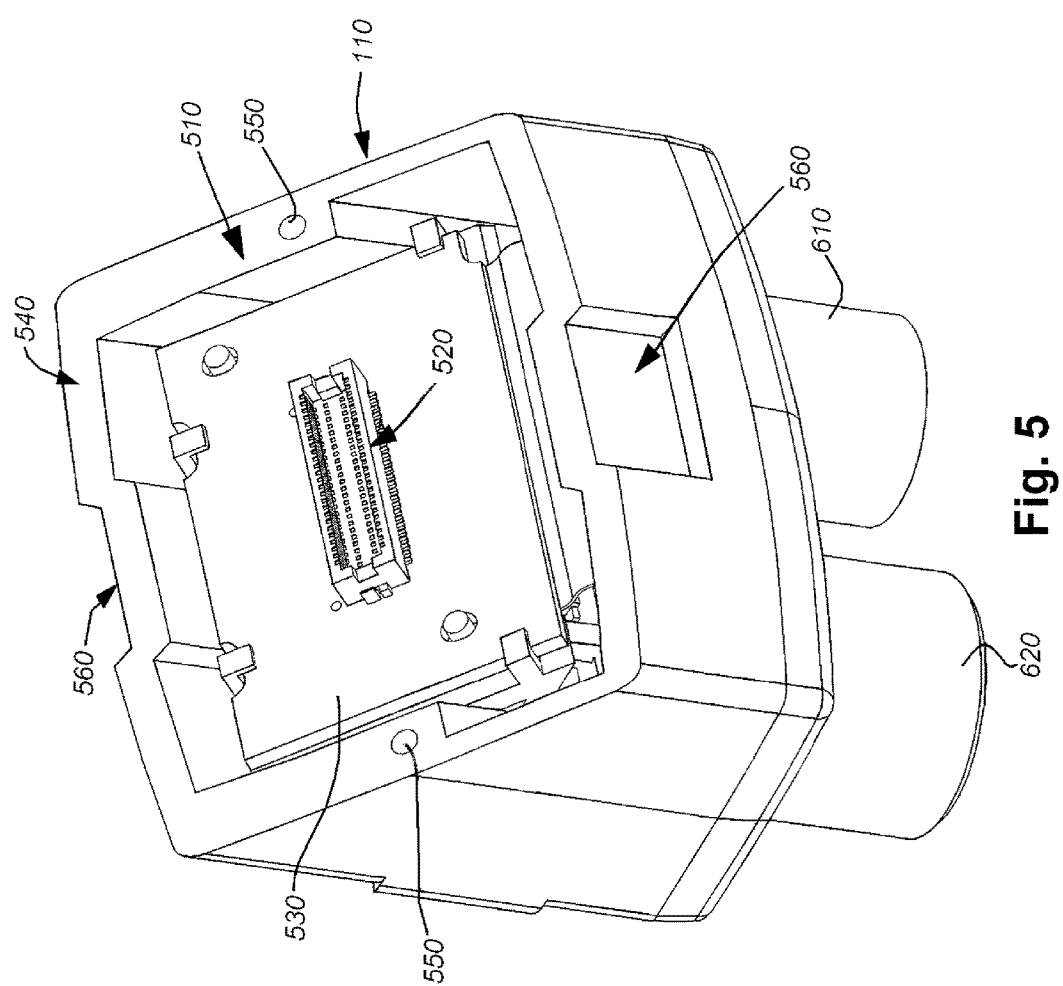

MODULAR VISION SYSTEM

FIELD OF THE INVENTION

This invention relates to machine vision systems, and more particularly to vision systems adapted to perform a plurality of vision system tasks.

BACKGROUND OF THE INVENTION

Vision systems that perform measurement, inspection, alignment of objects, surface profiling (e.g. sensing surface displacement using a projected laser line) part/feature detection and/or decoding of symbology (e.g. bar codes, or more simply "IDs") are used in a wide range of applications and industries. These systems are based around the use of an image sensor, which acquires images (typically grayscale or color, and in one, two or three dimensions) of the subject or object, and processes these acquired images using an on-board or interconnected vision system processor. The processor generally includes both processing hardware and non-transitory computer-readable program instructions that perform one or more vision system processes to generate a desired output based upon the image's processed information. This image information is typically provided within an array of image pixels each having various colors and/or intensities.

Often, a vision system camera includes an internal processor and other components that allow it to act as a standalone unit, providing a desired output data (e.g. decoded symbol information) to a downstream process, such as an inventory tracking computer system or logistics application.

The various vision system applications described above applications typically each dictate significant and discrete differences in the image formation system and/or communication interfaces, rendering a "universal" vision system platform problematic. One approach to offer more flexibility in the image formation system is to offer a number of accessories (lenses and lens attachments, thread extenders, illumination PCBs) but, especially with small devices, these accessory parts can be small and difficult to mount outside the production environment. Thus, this approach makes it challenging to attain optimum performance for each of the desired vision system applications.

In addition, various vision system tasks dictate vision system configurations with particular form factors to achieve optimal results. For example, in some applications it is more convenient to install the system with the cables and connectors (e.g. extending from the rear of the camera housing) in-line with the camera axis. Conversely, in other applications an "angled" system (e.g. with connectors/cables perpendicular to camera axis) provides a desired arrangement. Moreover, systems often lack versatility in types of communication interfaces—for example, a user may desire Ethernet, RS-232, serial, USB and/or FireWire, but be limited in the availability of such connectivity in the particular camera being employed.

By way of example, a vision system camera commercially available as model Lector 620 from Sick, Inc. of Minneapolis, Minn. provides a fixed camera body with a lens arrangement that rotates about a 45-degree angled surface on the body so as to orient the optical axis either in line with, or at 90-degrees with respect to the body's longitudinal axis. This is a relatively limited solution that only addresses the ability to place an otherwise fixed lens in either a "straight" or "angled" configuration with respect to the camera body.

Thus, all of the above-described challenges remain, to one extent or another, unsatisfied by existing vision system arrangements.

SUMMARY OF THE INVENTION

This invention overcomes disadvantages of the prior art by providing a modular vision system that is applicable to a wide range of specific and often disparate vision system tasks. In an embodiment, the modular vision system comprises at least three primary modules/components. A main module contains a vision sensor (imager), a vision processor and a user interface. An optical module contains a lens and focusing assembly, and an illumination assembly. An interface module contains interface electronics and appropriate external connectors. This novel combination of modules enables the overall system to be assembled in either a "straight" or linear (with longitudinal/optical axes of the interface and the main module in alignment) arrangement or an "angled"/"right-angle" (e.g. 90-degrees between the axes of each module) arrangement. This is achieved by providing the main module with a mating (angled) surface on the side opposite to the sensor that is e.g. 45 degrees with respect to the sensor (image) plane and the orthogonal camera axis. The interface module defines a similar mating (angled) surface e.g. 45 degrees with respect the surface containing the connectors for the cables and its orthogonal longitudinal axis. A connector assembly removably and electrically connects the interface module and the main module with an associated connector on each angled surface. The connector assembly, and each individual contact thereof, is constructed and arranged to enable interconnection of the main and interface modules in both the straight and right angle arrangements by rotating the modules on a rotation axis between a 0-degree and 180-degree orientation with respect to each other. More particularly, the system enables the entire interface module (with a variety of lens configurations, illumination options and/or other functions) to be mounted on the main module in at least two discrete angular orientations based upon the axial rotation of the interface module with respect to the main module. This arrangement, once fixed together, is then deployed to image a scene. In each orientation the connector delivers appropriate electrical contact to provide any and all desired signal and power functions between the modules based upon the arrangement of circuit components and connector pins. Illustratively, the main module includes an external surface for mounting a respective mating surface of various optical modules. Such optical modules can include a threaded mount for attachment of a lens that can be located at a predetermined working distance from the sensor image plane. Likewise, such optical modules can provide removable electrical connections to the main module that enable a variety of functions including, but not limited to, generalized lens optics, internal illumination, variable (and/or automatic) focus capability, laser line (structured illumination) projection and laser profiling optics. Additionally, a variety of communication interfaces, such as Ethernet, serial, RS-232, USB and/or FireWire can be made available to the user via one or more modules.

In an illustrative embodiment, the modular vision system includes a main module having a vision system processor and an image sensor. The main module defines a main module longitudinal axis and a main module mating surface with a main module connector. An interface module is also provided. It includes a power interconnect and communication interconnect each respectively constructed and arranged to operatively link to a remote location. The interface module, likewise, defines an interface module longitudinal axis and an interface module mating surface with an interface module connector. The main module mating surface and the interface module mating surface are constructed and arranged to be located in a mating relationship in each of two rotational orientations in which can angle between the main module longitudinal axis and the and the interface module varies for each of the two rotational orientations and the main module connector and interface module connector define a completed, active electrical connection in each of the two rotational orientations. The main module mating surface can be rotationally symmetrical about the rotation axis over 180 degrees and the rotation axis is non-parallel with (a) the main module longitudinal axis or (b) the interface module longitudinal axis. The rotation axis can be angled at approximately 45 degrees with at least one of (a) the main module longitudinal axis and (b) the interface module axis. Fasteners interconnect the main module to the interface module proximate to a joint therebetween. An optical module is constructed and arranged to mate with a front surface of the main module in optical communication with the sensor. The optical module includes at least one of a lens assembly, auto focus assembly and illumination assembly. The optical module and the front surface include mating electrical connectors that interconnect electrical signals between the main module and the optical module. The front surface includes alignment structures for guiding placement of the optical module with respect to the main module. The optical module is constructed and arranged to provide optical and illumination functions with respect to one of either inspection, alignment, manipulation, ID-reading, or part detection. The front surface of the main module can include aimer LEDs constructed and arranged to project through the optical module. Illustratively, the interface module connector can be a male connector and the main module connector can be a female connector. Alternatively, the interface module connector can be a female connector and the main module connector can be a male connector. At least one of the male connector and the female connector is recessed with respect to a surrounding housing perimeter. At least one of the male connector and the female connector can include two opposing strips of first contacts and the other of the male connector and the female connector can include at least one strip of second contacts. Each opposing strip of the first contacts is selectively interconnected with the strip of second contacts in each of the two rotational orientations, respectively. The main module includes a user interface panel located on an exterior thereof. Illustratively, the two rotational orientations are located 180-degrees apart.

BRIEF DESCRIPTION OF THE DRAWINGS

The invention description below refers to the accompanying drawings, of which:

FIG. 5 is a perspective view of the main module of FIG. 1 showing the connector for interconnecting the interface module;

DETAILED DESCRIPTION

Figure 1:
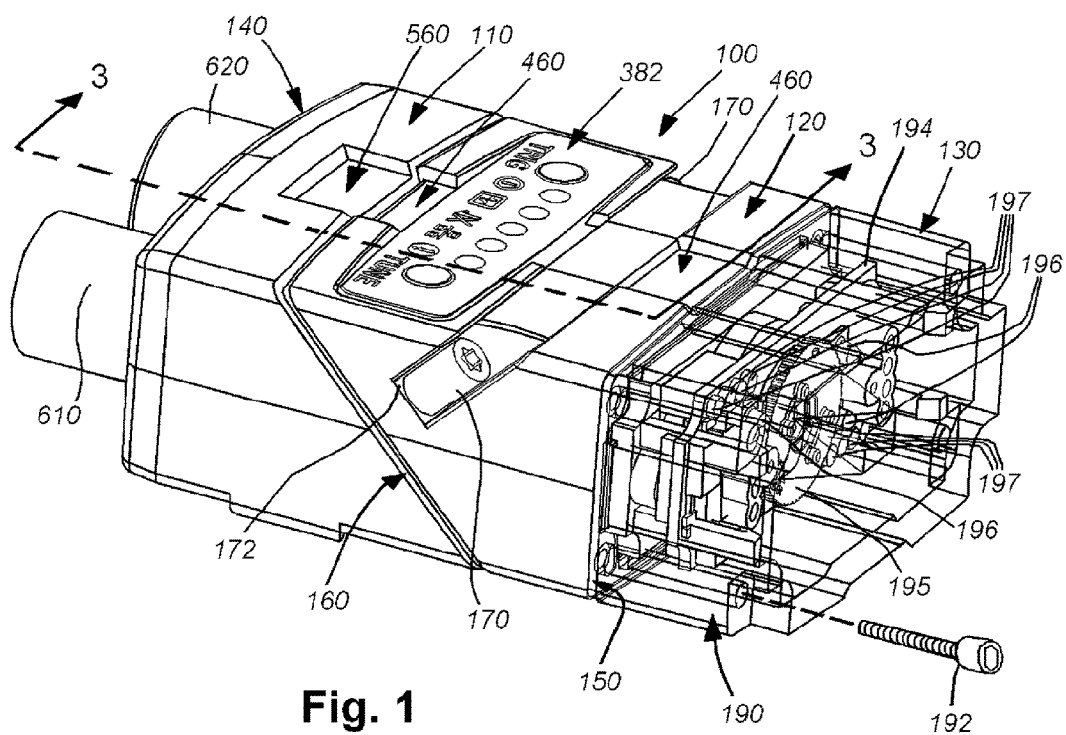
FIG. 1 is a perspective view of a modular vision system including an interface module and an interconnected main module arranged in a straight configuration, and including a variable focus optical module according to an illustrative embodiment.

FIG. 1 details a modular machine vision system (also termed briefly a "modular vision system, or "system") 100 according to an illustrative embodiment. The system 100 contains three primary components or "modules" that provide for modularity. These modules comprise an interface module 110, a main (sensor and vision processor) module 120, and an optical (and optional illumination) module 130. As shown in FIG. 1 and with further reference to the cross section of FIG. 3, the system 100 is arranged in a "straight" or linear configuration in which the longitudinal axis LAI and LAM of each module, 110 and 120, respectively, in alignment. The longitudinal axis in this embodiment is defined generally and the direction from the rear end to the front end of the module as shown. In this embodiment, the front end and rear end of each module 110, 120 contain appropriate connectors for interconnecting those modules together or for interconnecting other components, such as communication/power cables (at the interface module rear face 140) and an optical package (at the main module front face 150). These connectors and other associated components are described further below.

Figure 2:
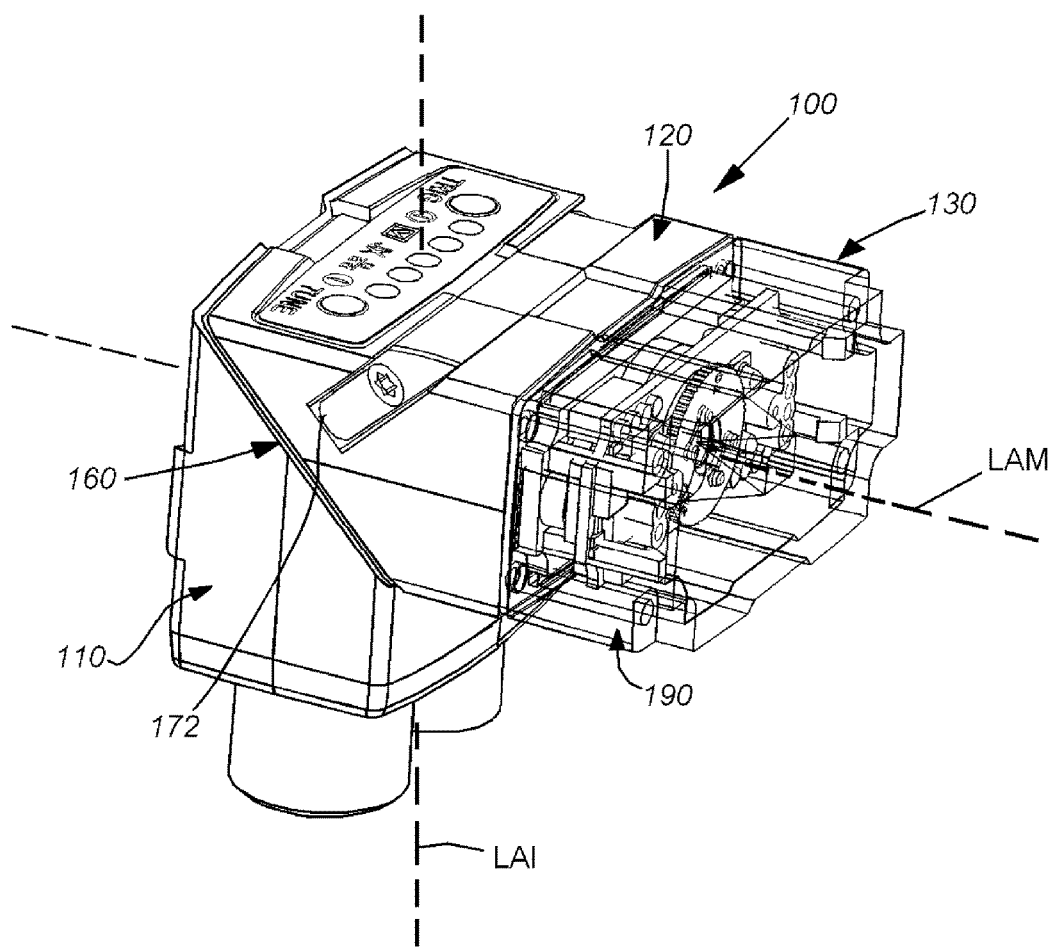
FIG. 2 is a perspective view of the modular vision system of FIG. 1 with the interface module and optical module arranged in a right-angle configuration.

Referring to FIG. 2, the system 100 can also be configured in an "angled" (e.g. right-angle) arrangement that is essentially non-linear. In this arrangement, the longitudinal axis LAI and LAM of each module 110 and 120, respectively, is orthogonal (perpendicular) with respect to the other module. Notably, the mating surfaces of each module are interconnected at a joint 160. With reference also to FIGS. 4 and 5, the main module 120 and interface module 110 are shown in further detail. The respective mating surface 410 and 510 of each module 120, 110 (respectively) is shown. In an illustrative embodiment, each surface is angled at a relative angle AC of 45 degrees (see FIG. 3) with respect to the module's longitudinal axis LAM and LAI. This allows the modules to be oriented in either the depicted straight/linear arrangement (FIG. 1) or the angled arrangement (FIG. 2) by selectively rotating either module through 180 degrees about its respective longitudinal axis and mating it to the opposing module.

Notably, each mating surface 410, 510 includes a respective connector component 420, 520. In this embodiment, the interface module connector 520 is a two-sided female strip connector with approximately 25 contact pads per side and the main module connector is a male strip connector 420 with approximately 25 aligned contact tabs per side. The pads of the female connector 520 are adapted to align with, and contact the tabs of the male connector 420 in each of opposing (180-degree) orientations. The female connector 520 is located on a circuit board 530 that is recessed within the surrounding housing frame 540. The opposing male connector 420 is likewise mounted on a circuit board 430 that is relatively flush with respect to the surrounding housing 440. This enables the height of the connectors to be accommodated with the modules are mated. In alternate embodiments, the main module or both modules can include an appropriate recess or a connector that engages in a flush-manner (i.e. requiring little or no recess for clearance can be employed). Both housings 440, 540 can be constructed from one or more appropriate materials—for example cast or extruded aluminum having good heat-dissipation properties with respect to the ambient environment. Note that the number and arrangement of pins in each connector is highly variable in alternate embodiments. In general, the connectors are constructed and arranged to enable interconnection in each of opposing 180-degree orientations (i.e. straight and angled configurations as described above—also termed ROTATION 1 and ROTATION 2).

As defined herein, the main module mating surface generally and illustratively defines a plane (overall) based on the perimeter edges of its housing. Likewise, the interface module mating surface illustratively defines a plane based on its housing's perimeter edges. Each plane is oriented non-perpendicular (e.g. angled to 45-degrees, or more simply "angled") with respect to the module's longitudinal axis. As described below, the mating surfaces can define a different geometry, such as a cylinder and/or spheroid.

Figure 5A:
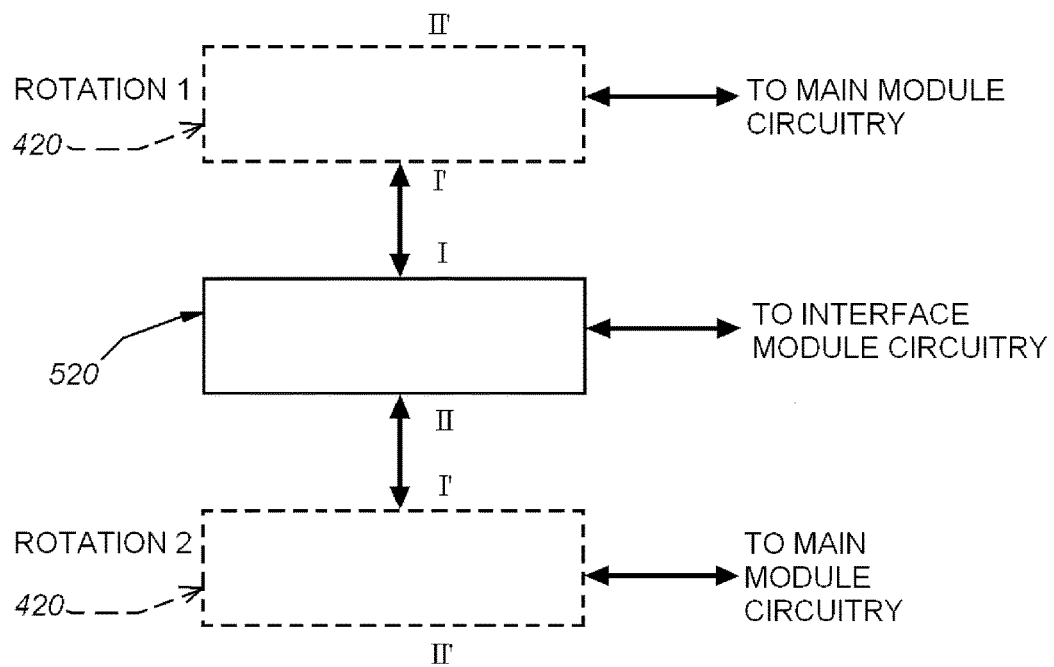
FIG. 5A is a schematic diagram of the main module and interface module connectors shown confronting each other in each of opposing rotations.
Figure 5B:
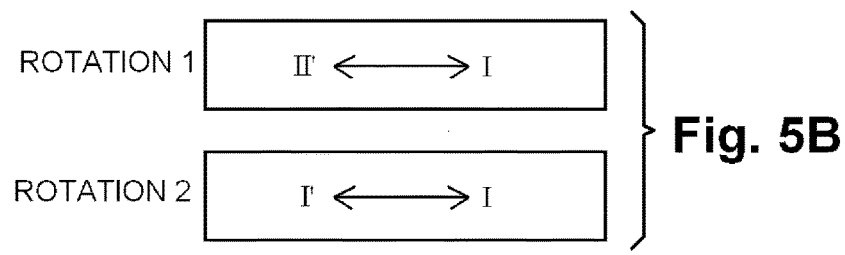
FIG. 5B is a schematic diagram showing the active pin alignment of the connectors of FIG. 5A in each of the opposing rotations.

With reference to FIG. 5A, the interface module (female) connector is shown in a single rotational position with the associated, mating main module (mail) connector rotated to each of opposing 180-degree orientations. Each side of each connector 520 and 420 is designated by an appropriate reference I, II and I', II', respectively. In one orientation I aligns with I' and II aligns with II'. In the opposing orientation, I aligns with II' and II aligns with I'. It is desired that in each orientation, the appropriate contact pads/tabs are mated to complete a proper interconnection (power, data, etc.). In an embodiment, one side of the connector 520 (I) is actively connected to the module circuitry and both sides (I' and II') of the connector 420 are actively connected to the module circuitry. Each side is connected to its contacts in a mirror image. Thus, as depicted in FIG. 5B, the connector side II' makes electrical contact with connector side I in ROTATION 1. Likewise, the connector side I' makes electrical contact with connector side I in ROTATION 2. Various electronic switching mechanisms can be employed to ensure only one side I' or II' is actively connected to the circuitry in a given orientation so as to avoid impedance mismatches and/or other undesirable electronic conditions. Moreover, in alternate embodiments both sides of each connector can be actively connected at all times and the switching mechanism can change the routing of connections (e.g. generating a mirror image of one of the contact arrangements) for each rotational orientation. A variety of techniques can be employed in accordance with skill in the art to allow the connectors to operate "ambidextrously".

Figure 3:
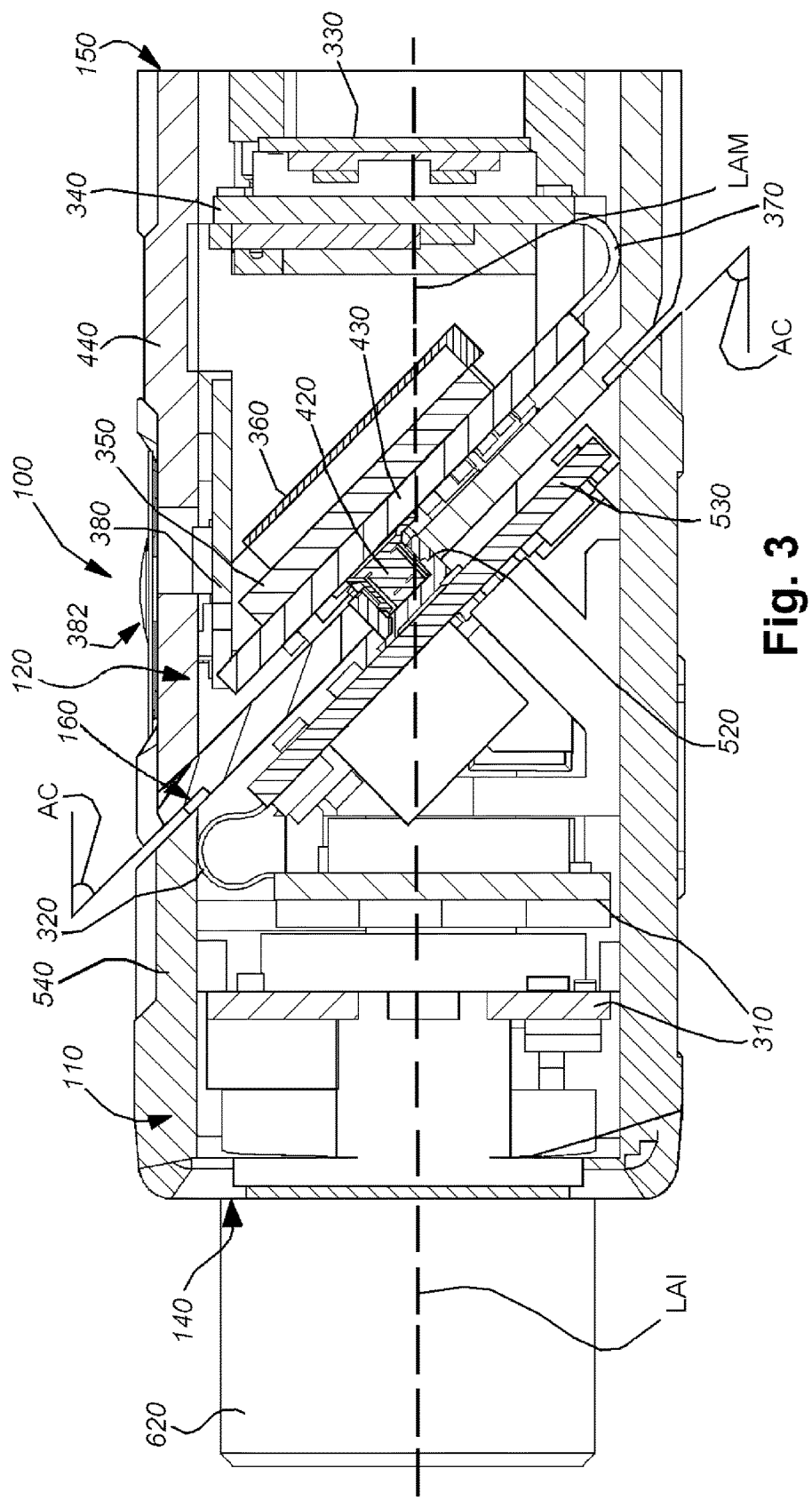
FIG. 3 is a side cross section of the modular vision system of FIG. 1.
Figure 4:
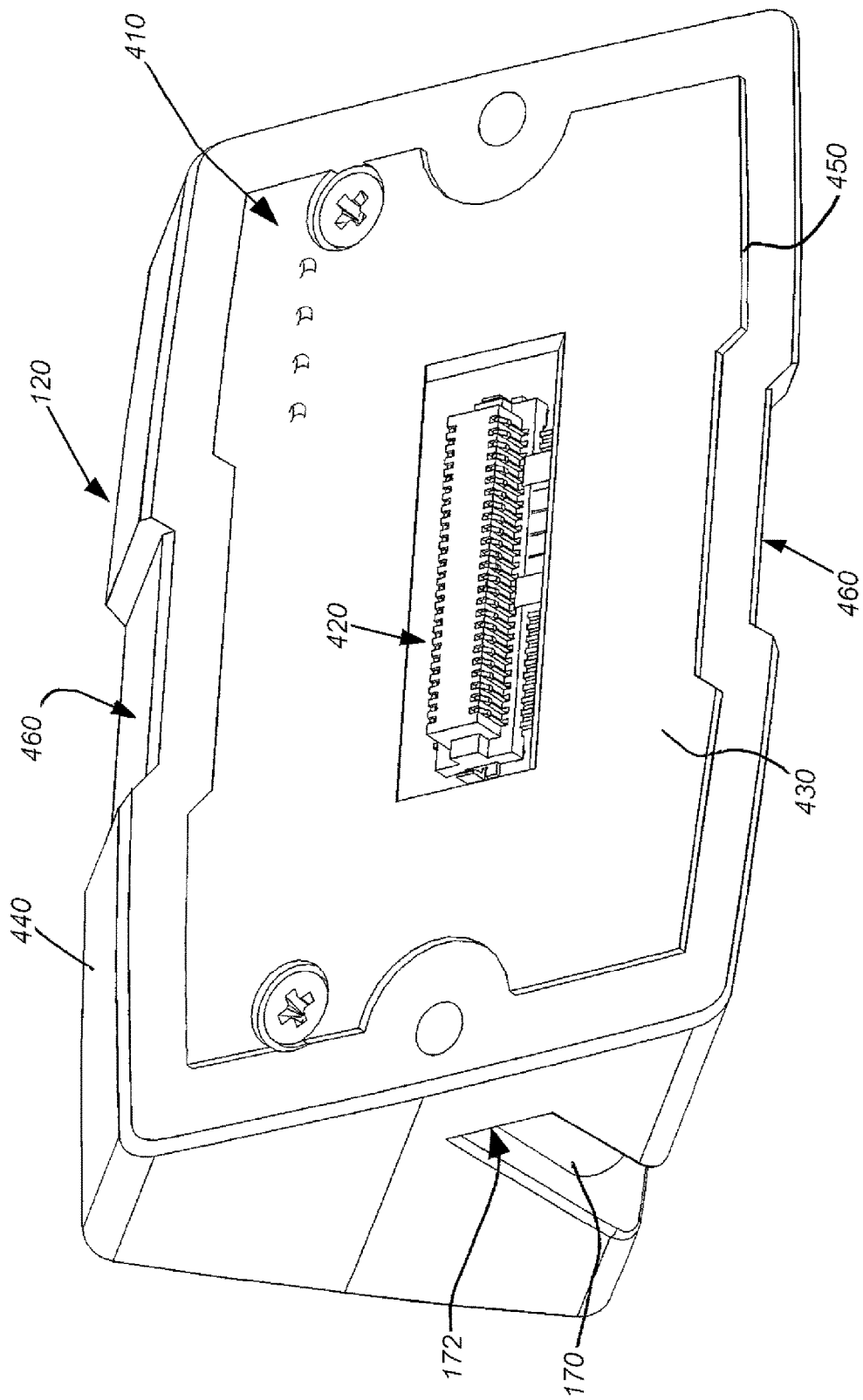
FIG. 4 is a perspective view of the interface module of FIG. 1 showing the connector for interconnecting the main module.
Figure 6:
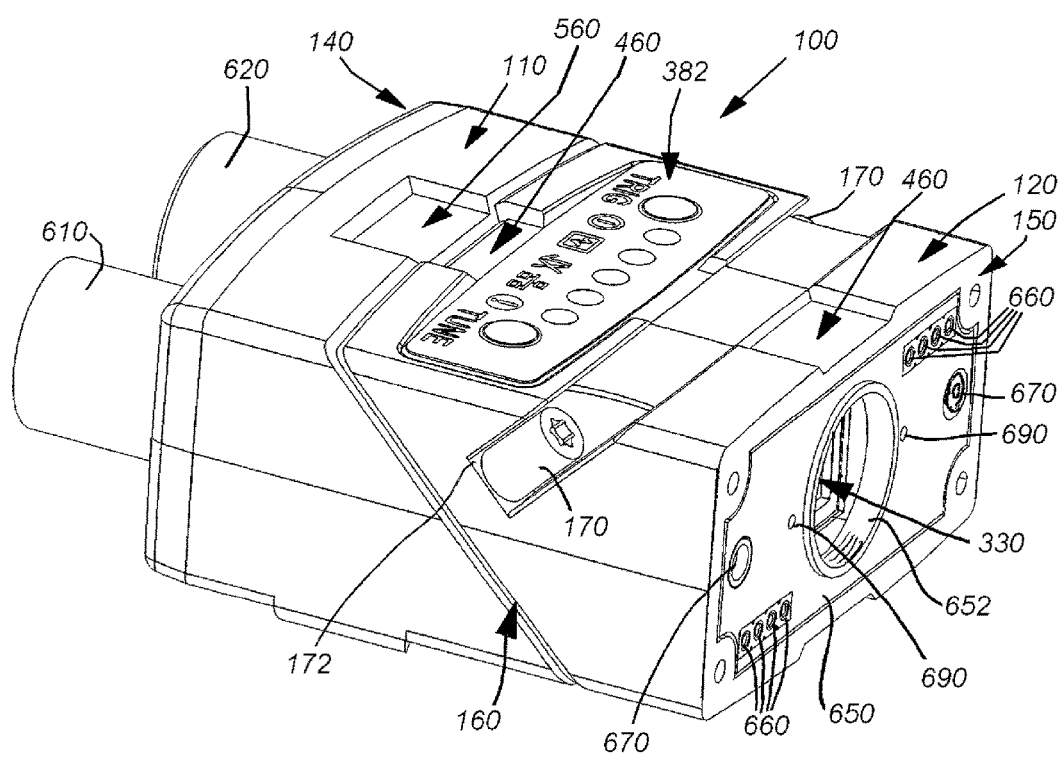
FIG. 6 is a perspective view of the modular vision system of FIG. 1 showing the mating surface for mounting the optical module.
Figure 7:
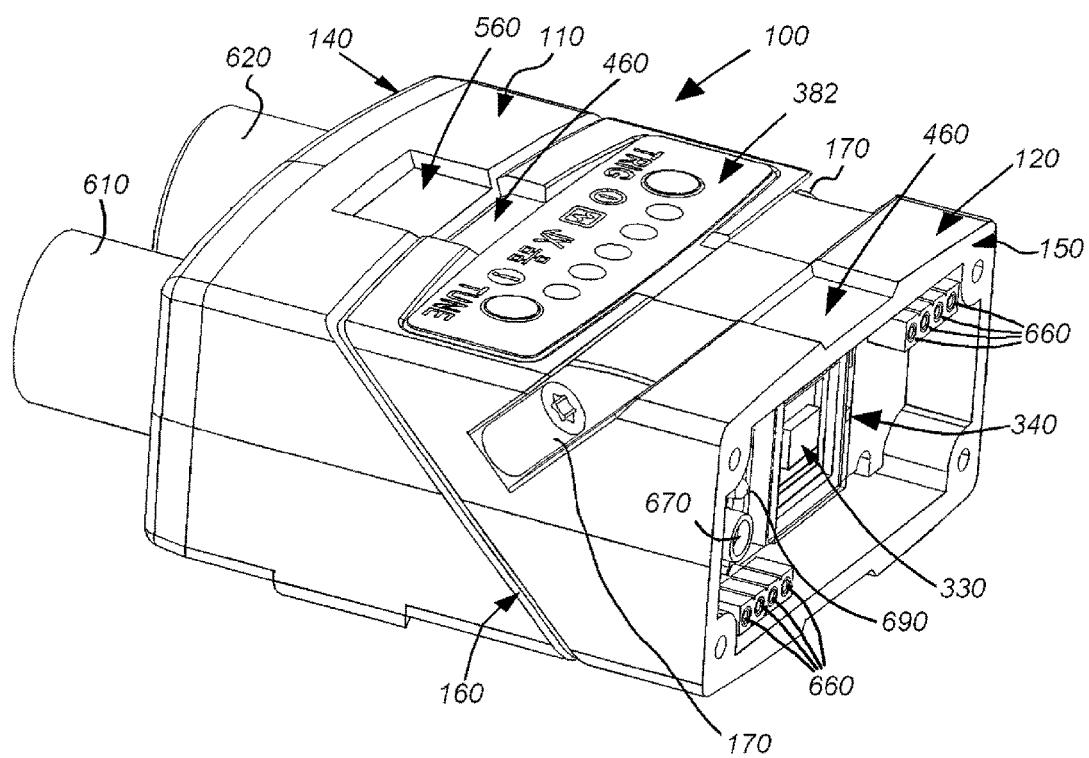
FIG. 7 is a perspective view of the modular vision system as depicted in FIG. 6 exposing the sensor.

With further reference to FIG. 3 and referring now to FIGS. 6 and 7, the system 100 (shown in the straight configuration) includes rear connectors 610, 620 for power, network communication and any other appropriate interconnect. The internal structure of the interface module 110 is highly variable, and can include a rear connector (printed) circuit board 310 associated circuitry. This circuit board assembly is interconnected by (for example) a ribbon cable 320 to the strip connector board 530 described above. The circuitry includes controllers for various power and data transfer functions as appropriate. The main module 120 includes a sensor 330 with an associated circuit board 340. This board and/or another component within the main module (illustratively, board 430) can include a vision system processor assembly 350 (e.g. a microcontroller or other appropriate processing device) that receives image data from the sensor 330 and provides appropriate image analysis—for example, ID-finding/decoding (i.e. one-dimensional and two-dimensional "barcode" reading), pattern recognition, alignment, robot manipulation, etc. The boards can include a plurality of heat sinks, and other thermal-transfer structures (e.g. pad 360) can be used to transfer heat toward the housing for dissipation into the environment. The connector and vision processor board 430 is interconnected with sensor board 340 via an appropriate ribbon cable 370.

Alternatively, a cable (not shown) can be permanently attached to the interface module for data communication interface functions and power. In this arrangement, the interface module can be free of the above-described connector assembly as it is directly connected to data and power sources.

A user interface board 380 with an associated external user interface panel 382 that provides various indications to a user during runtime (e.g. alarms, successful or unsuccessful ID-read/decode, part accept/reject, etc.), and can assist in programming and setup of the system 100.

Notably, the main module 120 is adapted to include all desired vision system image acquisition and image processing hardware/software for a variety of vision system tasks as described below. The data transmitted to and from the main module consists of interface-related data that is provided to the interface module for use in a networked environment. These data forms are generated within the interface module 110 and can be defined by standard communication protocols, such as IP or USB. This arrangement enables different modules to be adapted for different purposes with standard data forms (and power signals) passed therebetween.

In an illustrative embodiment, the main and interface modules 120, 110 are secured together at their joint 160 by a pair of threaded fasteners 170 located at each of opposing sides of each mated housing 540, 440. The fasteners 170 bear against base flats 172 on the main housing and thread into aligned threaded holes (550 in FIG. 5) on the interface module. In various embodiments, the fasteners 170 can be part of a mounting arrangement that includes additional threaded receptacles and/or structures enabling the attachment of mounting brackets, and the like. The outer perimeter edge 450 of the main module is adapted to align within the inner perimeter of the interface module housing. This assists in aligning the components for assembly with fasteners 170 in each of the opposing 180-degree opposed orientations. The perimeters are each symmetrical about their respective longitudinal axis in each 180-degree orientation. Note that each housing includes a pair of opposed recesses 460, 560 that align with each other in each 180-degree position. These recesses 460, 560 serve an ornamental purpose but also assist in aligning the housings. Note that a variety of alternate attachment mechanisms can be used to secure the modules together—such as clamps, snaps, spring-loaded catches, and the like. Additionally, the illustrative threaded fasteners assist in maintaining alignment and limiting lateral/rotational movement between the two modules 110, 120 when connecting the modules together. Illustratively, at least one of the module connectors can be flexibly mounted so as to provide limited springable motion during the connection process, during module assembly. The combination of the illustrative fastening/alignment arrangement and the flexible mounting of at least one of the connectors tends to limit the forces on the connectors during the connection process, preventing damage to the assembly.

In an illustrative embodiment, the front surface 150 of the main module 120 is arranged to mount the optical module (e.g. module 130 in FIG. 1). The main module is arranged to control functions of the associated optical module. The processor can be pre-programmed to recognize and adapt its processing functionality to the particular module from a variety of possible attached module types (for example recognizing the module type through a physical or electronic indicator). Alternatively, the main module can be custom-built/programmed for a specific optical module type.

The main module front face 150 comprises a (e.g. injection molded plastic, or another polymer, metal or composite material) plate 650 (FIG. 6) that resides within the inner perimeter of the module housing. And is secured thereto by appropriate fasteners. As shown, the plate includes a central orifice 652 that includes a standard thread for receiving a lens, such as an M12 type lens. The lens can be located relative to the image plane of the sensor 330 so as to provide appropriate focus of an imaged scene. The optical module (e.g. 130) can define an outer cover 190 (FIG. 1) that is secured to the main housing by threaded fasteners 192 or another mechanism. The cover can be transparent or translucent in whole or in part, as shown. The optical module 130 includes various internal structures and mechanisms. For example, a circuit board 194 that supports circuitry and motors for operating an auto-focus mechanism, including drive gear 195. The circuit board 194 can include optional illumination (e.g. LEDs 196) as appropriate. The board 194 also includes (male) connectors 197 that allow for the transmission of power and data signals to the optical module for controlling, focus, illumination, etc. These connectors 197 mate with appropriate (female) connectors 660 (FIG. 6) that reside flush with the front plate 650. The number and arrangement of optical module connectors is highly variable in alternate embodiments. The front plate 650 and underlying front face of the main module include receptacles for aligning associated pins prior to attachment of securing fasteners. The securement can be relatively loose or include a friction fit.

Note that the auto focus mechanism can be based on a mechanical system or alternatively, based upon a so-called liquid lens design that employs electromagnets to alter the shape of a liquid filled membrane to achieve variable focal distance. Such lenses are typically used in conjunction with an affixed lens, such as an M12 mount lens, that is threaded into the front face plate.

The sensor circuit board 340 on the main module includes optional aimer illuminators (e.g. LEDs) that project through ports 690 in the face plate 650 (FIG. 6). These LEDs are controlled by the vision system processor circuitry and associated vision system processes. They can be used to direct the field of view of the system with respect to the scene in a manner known to those of skill. In alternate embodiments, the aiming system, if provided, can be located in the optical module and controlled by the vision processor via the connections between the main and optical modules.

Figure 8:
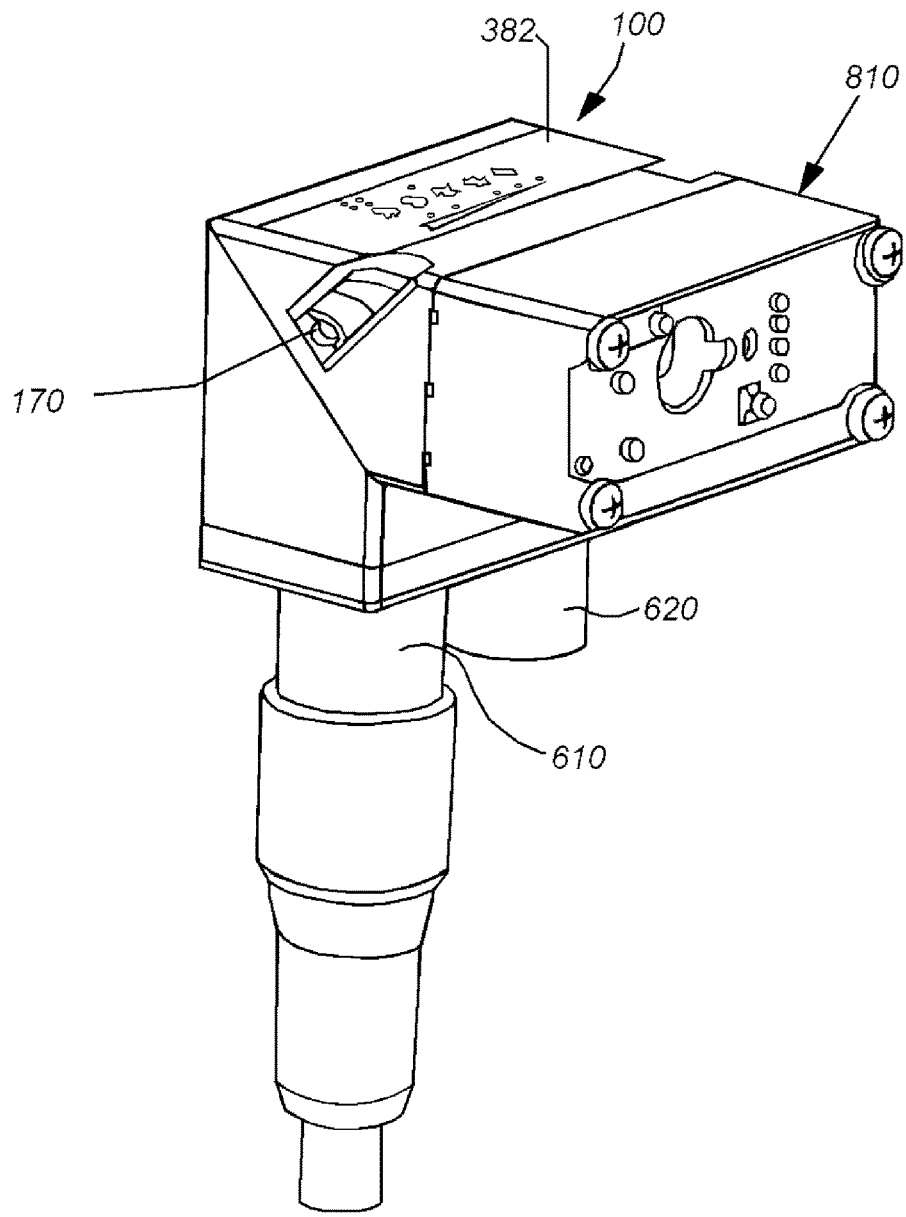
FIG. 8 is a perspective view of the modular vision system according to an embodiment, showing an optical module adapted for inspection or ID code reading arranged in an exemplary right-angle configuration.

As described above, a variety of optical modules can be integrated with the system 100. As shown in FIG. 8, the system 100 can include an exemplary inspection optical module (shown herein in a right-angle configuration). This module can include an auto-focus or fixed focus lens and an appropriate illumination package.

Figure 9:
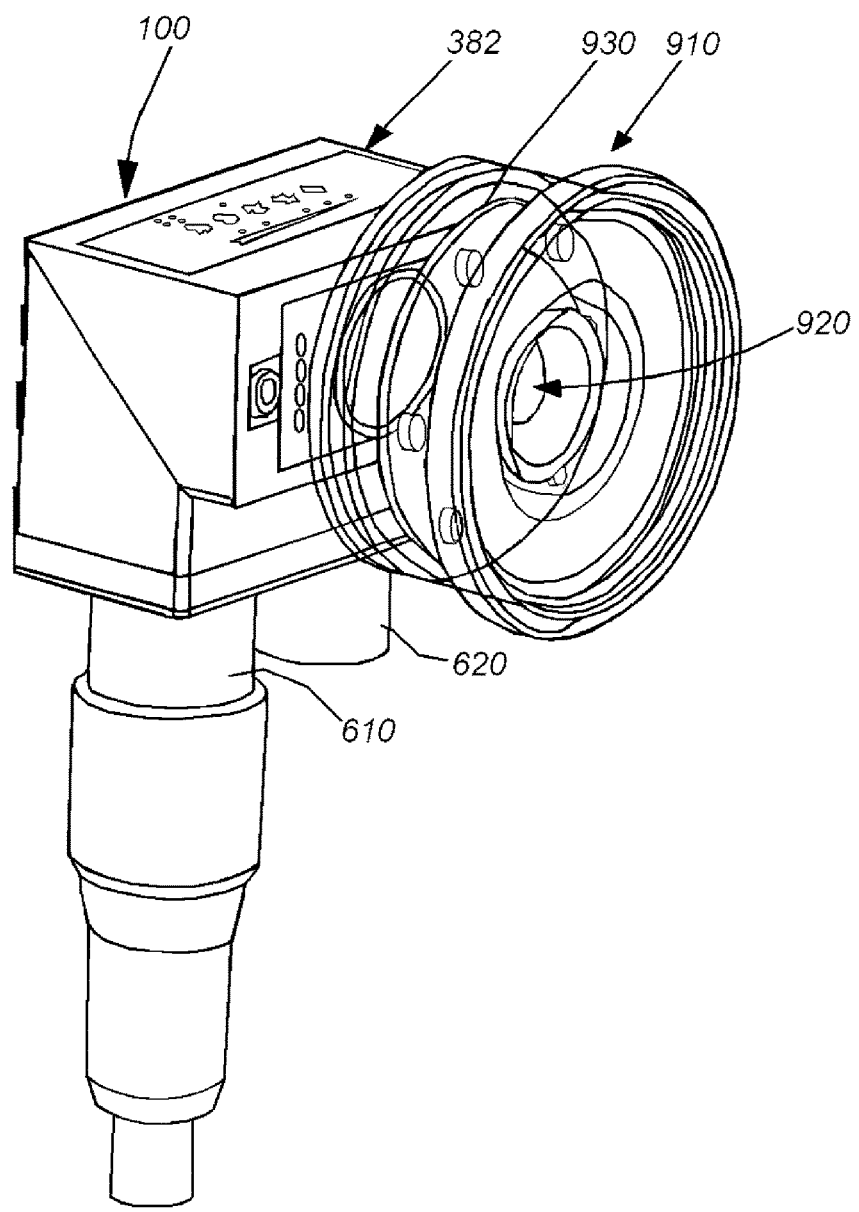
FIG. 9 is a perspective view of the of the modular vision system according to an embodiment, showing an optical module adapted for object detection arranged in an exemplary right-angle configuration.

Additionally, as shown in FIG. 9, an exemplary part/object detection module 910 is provided, including an appropriate fixed lens 920 and illuminator assembly 930. The mounting of this module 910 to the main module can be accomplished using appropriate brackets, fixtures, etc.

While not shown, optical modules having an active laser (or other illumination source) that provides a structured illumination in the form of a fan of light can be provided. Appropriate lens structures operating on, for example the Scheimpflug principle can be employed to image the line and thereby provide a laser-profiling module.

It is further contemplated that alternate arrangements of connectors can be employed to enable the modules to assume each of the straight and angled configurations described above with full power and data connectivity between the main and interface modules in each of the two (or more) configurations.

Figure 10:
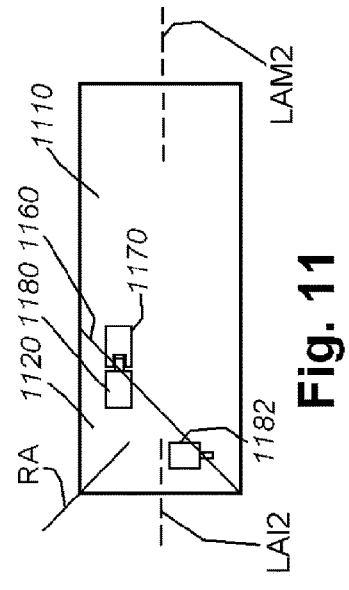
FIG. 10 is a schematic side view of the main module and interface module interconnected using a two separate connector assemblies on one module that are each located at an offset with respect to the rotation axis therebetween, and oriented generally perpendicular to a planar mating surface.

Reference is made to FIG. 10, which differs from the above-described connector arrangement in which both connectors are centered about the rotational axis RA between the two modules. As shown, the modules 1010 and 1020 are joined (in the straight configuration with longitudinal axes LAI1 and LAM1 in alignment, as shown) in alignment and the rotation axis RA is located at a 45-degree angle with respect to the mating surface (1060) plane. A single (e.g. female) connector assembly 1070 is provided at an offset with respect to the rotation axis RA. In this (0-degree) orientation, the (e.g. male) connector assembly 1080 is mated to the female connector assembly 1070. When the modules 1010 and 1020 are rotated 180 degrees with respect to each other, then the other offset connector assembly 1082 is in position to align with the female connector assembly 1070. Note that all connectors are generally oriented to engage each other in a direction parallel to the rotation axis RA and perpendicular to the planar mating surface plane. It should be clear that the positioning and number of male and female connector assemblies in any embodiment herein can be reversed relative to the illustrative embodiment.

Figure 11:
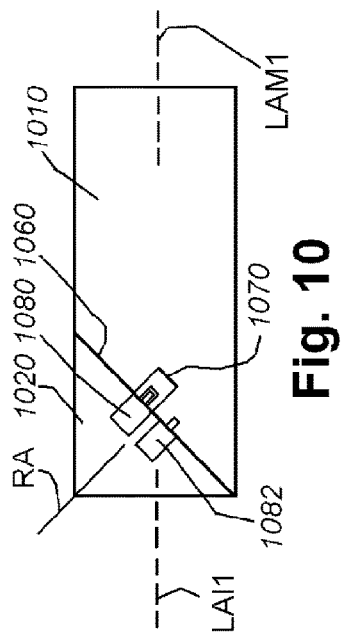
FIG. 11 is a schematic side view of the main module and interface module interconnected using a two separate connector assemblies on one module that are each located at an offset with respect to the rotation axis therebetween, and oriented generally non-perpendicular to a planar mating surface.

In FIG. 11, the modules 1110, 1120 are also mounted in the straight configuration with axes LAI2 and LAM2 in alignment. The (e.g. female) connector assembly 1170 is offset from the rotation axis RA and oriented to receive the opposing male connector assembly(s) non-parallel thereto (and non-perpendicular to the mating surface (1160) plane. The (e.g. male) connector assembly 1180 is shown arranged to engage the female connector assembly 1170 in the non-parallel (and non-perpendicular) orientation. Upon rotation 180 degrees, the other offset male connector assembly 1182 is arranged to engage to female connector assembly 1170 when the modules 1110, 1120 are configured in the appropriate angled (i.e. right-angle) alignment.

Figure 12:
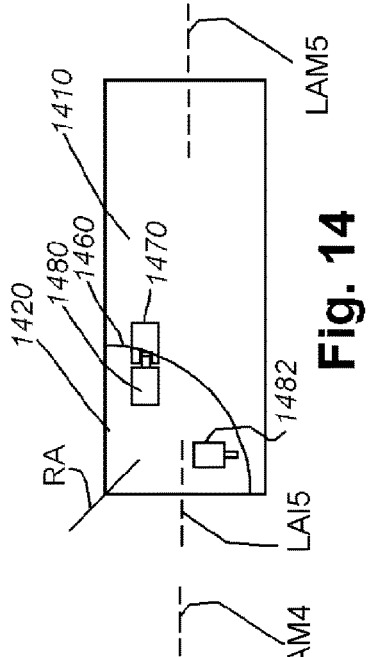
FIG. 12 is a schematic side view of the main module and interface module interconnected using a single set of male and female connector assemblies each located on a non-planar mating surface.

As noted herein, the mating surfaces of the two modules can be non-planar. With reference to FIG. 12, the modules 1210 and 1220 are aligned in the straight configuration with longitudinal axes LAI3 and LAM3 in alignment. The rotation axis RA is disposed at 45 degrees with respect the each axis. The mating surface 1260 defines a curvilinear shape, such as mating convex and concave cylindrical sections or spheroidal sections. In this embodiment, the (e.g. female) connector assembly 1270 is aligned parallel to and collinear with the rotation axis. Thus, a single, aligned (e.g. male) connector assembly 1280 can be employed in each rotational orientation (i.e. straight and angled). This connector assembly is, thus, aligned parallel and collinear to the rotation axis RA.

Figure 13:
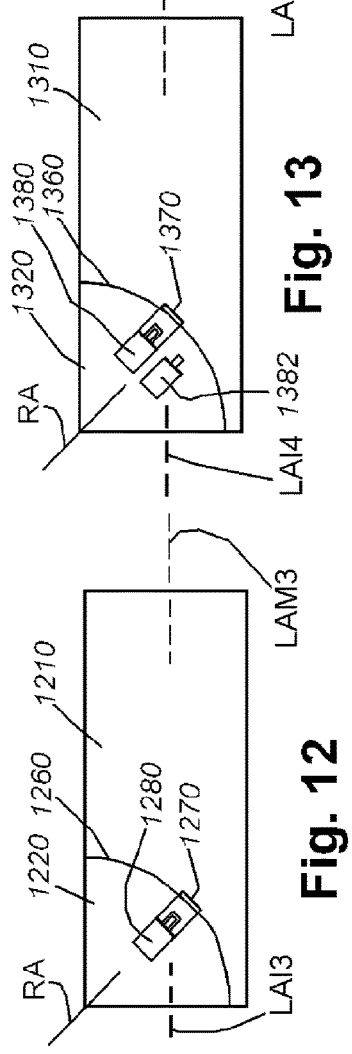
FIG. 13 is a schematic side view of the main module and interface module interconnected using a two separate connector assemblies on one module that are each located at an offset with respect to the rotation axis therebetween, and oriented generally parallel to the rotation axis and wherein the mating surface is non-planar.

With reference to FIG. 13, the modules 1310 and 1320 are also shown in the straight (i.e. 0-degree) configuration with longitudinal axes LAI4 and LAM4 in alignment. The modules 1310, 1320 engage along a curvilinear mating surface 1360 as described in FIG. 12. Illustratively, a single (e.g. female) connector assembly with an engagement direction that is parallel to, and offset from, the rotation axis RA is provided on one module 1110. The other module provides two offset (e.g. male) connector assemblies 1380 and 1382. The connector assembly 1380 is shown engaged to connector assembly 1370 in the depicted straight (0-degree) configuration, while the other offset connector assembly 1380 engages connector assembly 1370 in the (right-) angled (180-degree) configuration.

Figure 14:
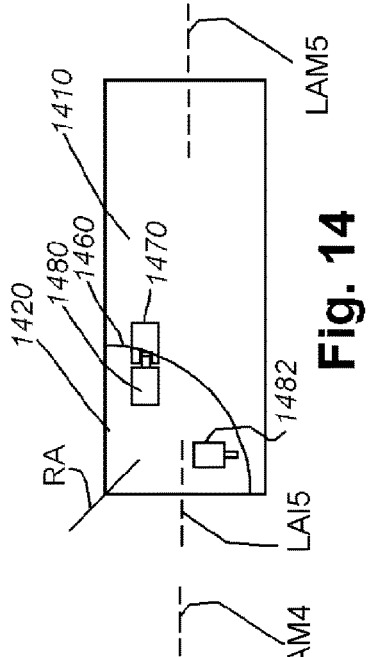
FIG. 14 is a schematic side view of the main module and interface module interconnected using a two separate connector assemblies on one module that are each located at an offset with respect to the rotation axis therebetween, and oriented generally non-parallel to the rotation axis and wherein the mating surface is non-planar.

In FIG. 14 the modules 1410 and 1420 are again depicted in the straight (0-degree) configuration with longitudinal axes LAI5 and LAM5 is alignment. A curvilinear mating surface (1460) arrangement, such as described above in reference to FIG. 12 is provided between the engaged modules 1410, 1420. The (e.g. female) connector assembly 1470 is located at an offset from, and with an engagement direction non-parallel to, the rotation axis RA. One of a pair of (e.g. male) connector assemblies (1480) is shown in engagement with the connector assembly 1470 in this configuration. In an (right-) angled configuration, the opposing offset (e.g. male) connector assembly 1482 engages the connector assembly 1470.

Illustratively, where the two main configurations between module longitudinal axes are a straight (aligned/collinear) orientation and a right (90-degree) angled orientation, then the following general parameters apply: (a) the mating surface is rotationally symmetric over 180 degrees of rotation about the rotation axis; and (b) the angle between the approximate axis of symmetry for rotation and the longitudinal axis of the interface and main modules is 45 degrees.

It should be clear that the above-described modular vision system affords the user with significant versatility in both the task being performed and the available form factor. This system allows for convenient and cost-effective assembly of a specific system by the manufacturer or initial assembly/re-purposing of a system by the end user. Advantageously, the system enables the entire interface module (with a variety of lens configurations, illumination options and/or other functions) to be mounted on the main module in at least two discrete angular orientations based upon the axial rotation of the interface module with respect to the main module. This arrangement, once fixed together, is then deployed to image a scene. Unlike prior arrangements, such as the Sick Lector 620 in which the permanently mounted lens is rotated in a fixed module, the illustrative interface module is assembled to the main module in the desired angle and with the desired set of features (including selected lens optics), and then deployed for operation.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein the terms "process" and/or "processor" should be taken broadly to include a variety of electronic hardware and/or software based functions and components. Also, as used herein various directional and orientational terms such as "vertical", "horizontal", "up", "down", "bottom", "top", "side", "front", "rear", "left", "right", and the like, are used only as relative conventions and not as absolute orientations with respect to a fixed coordinate system, such as gravity. Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Moreover, it is contemplated that some or all vision system processing tasks can be carried out either in the main module or in a remote processor (e.g. a server or PC) that is operatively connected through the interface module to the main module via a wired or wireless communication (network) link. Accordingly, this description is meant to be taken only by way of example, and not to otherwise limit the scope of this invention.

What is claimed is:

1. A modular vision system comprising:
a main module having a vision system processor and an image sensor, the main module defining a main module longitudinal axis and a main module mating surface with a single main module connector; and
an interface module having a power interconnect and communication interconnect each respectively constructed and arranged to operatively link to a remote location, the interface module defining an interface module longitudinal axis and an interface module mating surface with a single interface module connector, wherein the main module mating surface and the interface module mating surface are constructed and arranged to be located in a mating relationship in each of two rotational orientations in which an angle between the main module longitudinal axis and the interface module longitudinal axis varies for each of the two rotational orientations and a first side of the single main module connector is aligned with a first side of the single interface module connector and a second side of the single main module connector is aligned with a second side of the single interface module connector to define a first electrical connection in a first rotational orientation of the two rotational orientations and the second side of the single main module connector aligns with the first side of the single interface module and the second side of the single interface module connector aligns with the first side of the single main module connector to define a second electrical connection in a second rotational orientation of the two rotational orientations.

2. The modular vision system as set forth in claim 1 wherein the main module mating surface is rotationally symmetrical about a rotation axis between the main module and the interface module over 180 degrees.

3. The modular vision system as set forth in claim 2 wherein the rotation axis is angled at approximately 45 degrees with at least one of (a) the main module longitudinal axis and (b) the interface module longitudinal axis.

4. The modular vision system as set forth in claim 3 further comprising fasteners that interconnect the main module to the interface module proximate to a joint therebetween.

5. The modular vision system as set forth in claim 1 further comprising an optical module constructed and arranged to mate with a front surface of the main module in optical communication with the image sensor, the optical module including at least one of a lens assembly, auto focus assembly, an illumination assembly and a structured illumination assembly.

6. The modular vision system as set forth in claim 5 wherein each of the optical module and the front surface include mating electrical connectors that interconnect electrical signals between the main module and the optical module.

7. The modular vision system as set forth in claim 6 wherein the front surface includes alignment structures for guiding placement of the optical module with respect to the main module.

8. The modular vision system as set forth in claim 6 wherein the optical module is constructed and arranged to provide optical and illumination functions with respect to one of either inspection, alignment, manipulation, ID-reading, or part detection.

9. The modular vision system as set forth in claim 6 wherein the front surface of the main module includes aimer LEDs constructed and arranged to project through the optical module.

10. The modular vision system as set forth in claim 1 wherein (a) the interface module connector is a male connector and the main module connector is a female connector or (b) the interface module connector is a female connector and the main module connector is a male connector, respectively.

11. The modular vision system as set forth in claim 10 wherein at least one of the male connector and the female connector is recessed with respect to a surrounding housing perimeter.

12. The modular vision system as set forth in claim 10 wherein at least one of the male connector and the female connector includes two opposing strips of first contacts and the other of the male connector and the female connector includes at least one strip of second contacts, each opposing strip of the first contacts being selectively interconnected with the strip of second contacts in each of the two rotational orientations, respectively.

13. The modular vision system as set forth in claim 1 wherein the main module includes a user interface panel located on an exterior thereof.

14. The modular vision system as set forth in claim 1 wherein the two rotational orientations are located 180-degrees apart.

15. The modular vision system as set forth in claim 1 wherein the interface module mating surface and the main module mating surface each define a non-planar surface.

16. The modular vision system as set forth in claim 15 wherein the non-planar surface defines a cylindrical or spheroidal surface.

17. The modular vision system as set forth in claim 2, wherein the rotation axis is non-parallel with the main module longitudinal axis.

18. The modular vision system as set forth in claim 2, wherein
the rotation axis is non-parallel with the interface module longitudinal axis.

19. The modular vision system as set forth in claim 1,
wherein the first electrical connection comprises electrical contact between the second side of the single main module connector and the first side of the single interface module connector, and
wherein the second electrical connection comprises electrical contact between the first side of the single main module connector and the first side of the single interface module connector.

20. A modular vision system comprising:
a main module having a vision system processor and an image sensor, the main module defining a main module longitudinal axis and a main module mating surface with a main module connector; and
an interface module having a power interconnect and communication interconnect each respectively constructed and arranged to operatively link to a remote location, the interface module defining an interface module longitudinal axis and an interface module mating surface with a interface module connector,
wherein the main module mating surface and the interface module mating surface are constructed and arranged to be located in a mating relationship in each of two rotational orientations in which an angle between the main module longitudinal axis and the interface module longitudinal axis varies for each of the two rotational orientations and a first side of the main module connector is aligned with a first side of the interface module connector and a second side of the main module connector is aligned with a second side of the interface module connector to define a first electrical connection in a first rotational orientation of the two rotational orientations and the second side of the main module connector aligns with the first side of the interface module and the second side of the interface module connector aligns with the first side of the main module connector to define a second electrical connection in a second rotational orientation of the two rotational orientations.

* * * * *